US012686176B2

(12) United States Patent
Yuasa

(10) Patent No.: US 12,686,176 B2
(45) Date of Patent: Jul. 21, 2026

(54) MODELED OBJECT AND ITS MANUFACTURING METHOD, METHOD OF CREATING MODELING DATA

(71) Applicant: KYORAKU CO., LTD., Kyoto (JP)

(72) Inventor: Ryohei Yuasa, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 66 days.

(21) Appl. No.: 18/838,371

(22) PCT Filed: Feb. 17, 2023

(86) PCT No.: PCT/JP2023/005803

§ 371 (c)(1),
(2) Date: Aug. 14, 2024

(87) PCT Pub. No.: WO2023/162890

PCT Pub. Date: Aug. 31, 2023

(65) Prior Publication Data

US 2025/0236073 A1      Jul. 24, 2025

(30) Foreign Application Priority Data

Feb. 22, 2022    (JP) ................................. 2022-026009
Feb. 22, 2022    (JP) ................................. 2022-026010

(51) Int. Cl.
B29C 64/386        (2017.01)
B29C 64/118        (2017.01)
(Continued)

(52) U.S. Cl.
CPC ............ B29C 64/386 (2017.08); B33Y 50/00 (2014.12); B29C 64/118 (2017.08); B33Y 10/00 (2014.12)

(58) Field of Classification Search
CPC ... B29C 66/45; B29C 65/3456; B29C 64/147; B29C 53/382; B29C 48/0021; B29C 64/40; B29C 64/393; B29C 64/386
See application file for complete search history.

(56) References Cited

U.S. PATENT DOCUMENTS 10,471,665 B1    11/2019  Marshall, Jr. et al.
2017/0136703 A1*  5/2017  Hayes .................... B33Y 50/00
(Continued)

FOREIGN PATENT DOCUMENTS

DE         3922459      *  2/2020
EP         3812134 A1      4/2021
(Continued)

OTHER PUBLICATIONS

International Search Report issued on May 16, 2023, in corresponding International Application No. PCT/JP2023/005803; 6 pages.
(Continued)

*Primary Examiner* — Stella K Yi
(74) *Attorney, Agent, or Firm* — Maier & Maier, PLLC

(57) ABSTRACT

The present invention provides a modeled object manufacturable with high precision in a short amount of time that may have a complex-shaped base structure. According to the present invention, the object is manufactured from modeling data prepared by selecting part of tool paths, from source data, for forming respective single-layer structures obtained by slicing a base structure at predetermined modeling pitches, wherein the selecting is performed in such a way that the larger a change in shape between tool paths of upper and lower layers is in the source data, the shorter an interlayer spacing in the source data is made.

7 Claims, 13 Drawing Sheets

1

(51) Int. Cl.
    *B33Y 10/00*       (2015.01)
    *B33Y 50/00*       (2015.01)

(56)                 References Cited

U.S. PATENT DOCUMENTS

| | | |
|---|---|---|
| 2018/0290377 A1 | 10/2018 | Talken et al. |
| 2018/0311897 A1 | 11/2018 | Arnon et al. |
| 2018/0370125 A1 | 12/2018 | Rolland et al. |
| 2019/0168449 A1 | 6/2019 | Talken et al. |
| 2020/0139618 A1 | 5/2020 | Talken et al. |
| 2020/0231803 A1 | 7/2020 | Amiel-Levy et al. |
| 2021/0221048 A1 | 7/2021 | Talken et al. |
| 2022/0105675 A1 | 4/2022 | Yuasa et al. |
| 2022/0135721 A1 | 5/2022 | Talken et al. |
| 2023/0103463 A1 | 4/2023 | Amiel-Levy et al. |

FOREIGN PATENT DOCUMENTS

| | | |
|---|---|---|
| JP | 2019503891 A | 2/2019 |
| JP | 2019142089 A | 8/2019 |
| JP | 2020516506 A | 6/2020 |
| JP | 2020146988 A | 9/2020 |
| JP | 2020528488 A | 9/2020 |
| JP | 2021525187 A | 9/2021 |

OTHER PUBLICATIONS

Extended Search Report issued on Apr. 28, 2025, in corresponding European Application No. 23759891.7, 14 pages.
Office Action issued on Jan. 20, 2026 in corresponding Japanese Application No. 2022-026010, 6 pages.

\* cited by examiner

1

21st layer

22nd layer

23rd layer

24th layer

25th layer

26th layer

27th layer

28the layer

29th layer

30th layer

1st layer

6th layer

2nd layer

7th layer

3rd layer

8th layer

4th layer

9th layer

5th layer

10th layer

11th layer

12th layer

13th layer

14th layer

15th layer

16th layer

17th layer

18th layer

19th layer

20th layer

21st layer

22nd layer

23rd layer

24th layer

25th layer

26th layer

27th layer

28th layer

29th layer

30th layer

31st layer

36th layer

32nd layer

37th layer

33rd layer

38th layer

34th layer

39th layer

35th layer

40th layer

41st layer

42nd layer

43rd layer

44th layer

45th layer

46th layer

47th layer

48th layer

49th layer

50th layer

51st layer

52nd layer

53rd layer

54th layer

55th layer

56th layer

57th layer

58th layer

59th layer

60th layer

Fig. 11 A
Fig. 11B
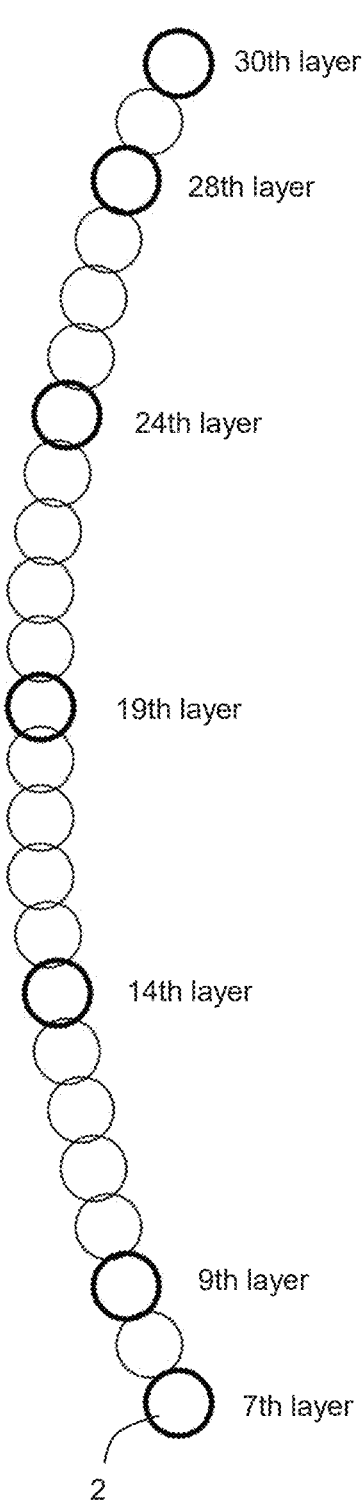
30th layer
28th layer
24th layer
19th layer
14th layer
9th layer
7th layer
2
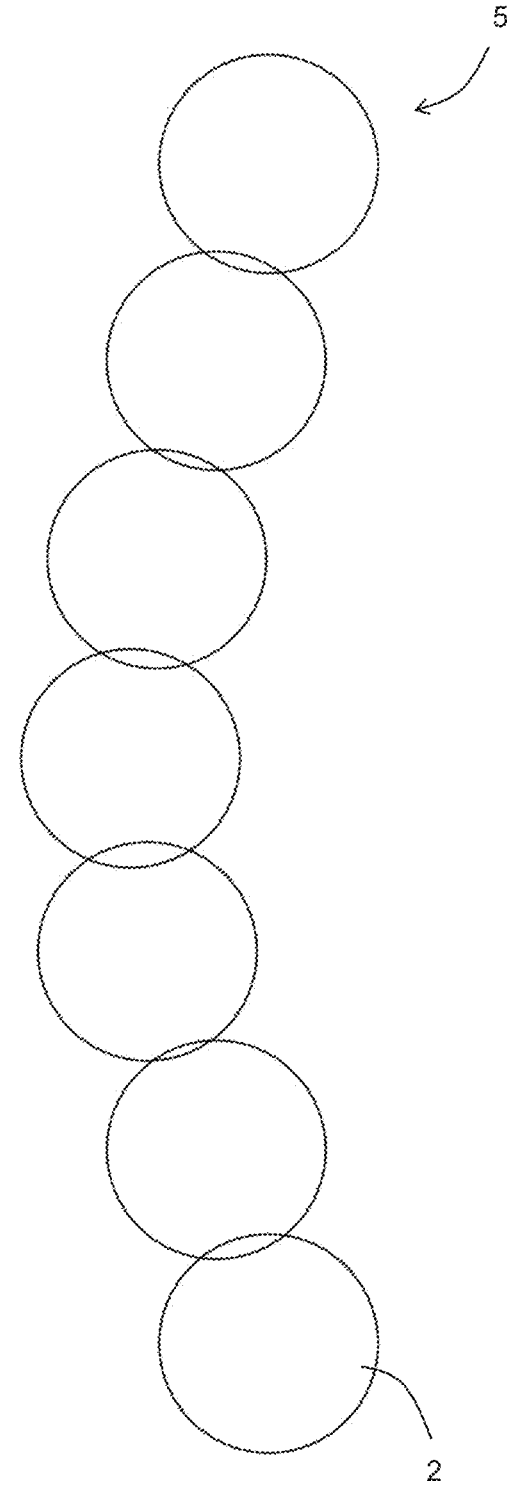
5
2

MODELED OBJECT AND ITS MANUFACTURING METHOD, METHOD OF CREATING MODELING DATA

BACKGROUND OF THE INVENTION

Field of the Invention

The present invention pertains to an object manufacturable by additive manufacturing, a method for manufacturing such an object, and a method for preparing modeling data for manufacturing such an object.

Description of the Related Art

Patent Literature 1 below discloses a method for manufacturing an object having a three-dimensional sieve-like structure by laminating single-layer structures.

PATENT LITERATURE

Patent Literature 1: JP2020-146988

SUMMARY OF THE INVENTION

Technical Problem (First Perspective)

Each of the single-layer structures disclosed in Patent Literature 1 has a plurality of parallel line portions; the extending direction of the parallel line portions changes by 60 degrees between a pair of single-layer structures adjacent in the vertical direction. An object with such a structure has excellent flexibility, but also has significantly different deformability against loading from different directions (e.g., vertical vs. lateral loading). Hence, such an object as mentioned above is not suitable for applications where the object is used as a cushioning material (e.g., particularly as a cushioning material that may come into contact with human body, such as an insole, a part of a prosthetic leg, etc.), which desirably requires isotropic deformability (i.e., having equal deformability against loading from different directions).

To solve the above-mentioned problem, a complex-shaped structure such as a gyroid structure may be used, but a complex-shaped structure cannot be easily manufactured with high precision in a short amount of time.

The present invention is motivated to solve these problems by providing a complex-shaped object manufacturable with high precision in a short amount of time.

(Second Perspective)

Each of the single-layer structures disclosed in Patent Literature 1 has a peripheral line portion surrounding the outer periphery. The peripheral line portion contributes to increasing the strength of the object, but also unnaturally stiffens the surfaces of the object. Hence, an object that includes such a peripheral line portion is not suitable for applications where the object is used as a cushioning material (e.g., particularly as a cushioning material that may come into contact with human body, such as an insole, a part of a prosthetic leg, etc.), which requires natural softness/hardness in its entirety.

However, removing a peripheral line portion from an object (e.g., the object disclosed in Patent Literature 1) results in placing an end of thread-shaped resin, which constitutes each of the single-layer structures, on an outer peripheral portion of the single-layer structures. The object becomes susceptible to delamination initiating at such an end if the end is located on an outer peripheral portion of the single-layer structures.

The present invention is motivated to provide an object unsusceptible to having an unnatural hardness and delamination.

Solution to Problem (First Perspective)

The present invention provides a modeled object manufactured from modeling data prepared by selecting part of tool paths, from source data, for forming respective single-layer structures obtained by slicing a base structure at predetermined modeling pitches, wherein the selecting is performed in such a way that the larger a change in shape between tool paths of upper and lower layers is in the source data, the shorter an interlayer spacing in the source data is made.

In the present invention, the object is manufactured from modeling data prepared by selecting tool paths in such a way that the larger a change in shape between tool paths of upper and lower layers is in the source data, the shorter an interlayer spacing in the source data is made. Hence, the present invention facilitates manufacturing an object with high precision in a short amount of time that may have a complex-shaped base structure.

Various exemplary embodiments of the present invention are described below; they may be combined with one another.

Preferably, in the aforementioned object, the base structure is a three-dimensional periodic minimal curved surface with thickness.

Preferably, in a method for manufacturing a modeled object, the method comprises creating the object via additive manufacturing using modeling data prepared by selecting part of tool paths, from source data, for forming respective single-layer structures obtained by slicing a base structure at predetermined modeling pitches, wherein the selecting is performed in such a way that the larger a change in shape between tool paths of upper and lower layers is in the source data, the shorter an interlayer spacing in the source data is made.

Preferably, in a method for preparing modeling data, the method comprises selecting part of tool paths, from source data, for forming respective single-layer structures obtained by slicing a base structure at predetermined modeling pitches, wherein the selecting is performed in such a way that the larger a change in shape between tool paths of upper and lower layers is in the source data, the shorter an interlayer spacing in the source data is made.

Preferably, in the aforementioned methods, the base structure is a three-dimensional periodic minimal curved surface with thickness.

(Second Perspective)

The present invention provides a modeled object comprising a plurality of laminated single-layer structures each composed of formed thread-shaped resin, wherein the thread-shaped resin of at least one of the plurality of single-layer structures comprises a folded portion folded back at a folding point provided on an outer peripheral portion of the at least one single-layer structure, the folded portion is located inner to the outer peripheral portion and is a portion between an end of the thread-shaped resin and the folding point.

In at least one single-layer structure included in the object of the present invention, the thread-shaped resin constituting the single-layer structure comprises a folded portion folded back at a folding point provided on an outer peripheral portion of the at least one single-layer structure, the folded portion is located inner to the outer peripheral portion. An object with such features is unsusceptible to delamination initiating at an end of the thread-shaped resin as well as to having an unnatural hardness.

Various exemplary embodiments of the present invention are described below; they may be combined with one another.

Preferably, in the aforementioned object, the end is welded to the outer peripheral portion.

Preferably, in a method for manufacturing a modeled object comprising a step of laminating a plurality of single-layer structures, the plurality of single-layer structures are each composed of thread-shaped resin formed by moving a nozzle extruding fluidized resin along tool paths, the tool path of at least of the plurality of single-layer structures includes a folded portion folded back at a folding point provided on an outer peripheral portion of the tool path, the folded portion is located inner to the outer peripheral portion and is a portion between an end of the tool path and the folding point.

Preferably, in the aforementioned method, the end is placed on the outer peripheral portion.

BRIEF DESCRIPTION OF THE DRAWINGS

FIG. 11A shows single-layer structures 2 being laminated using tool paths 4 of the source data created at a modeling pitch of 0.1 mm, and FIG. 11B shows single-layer structures 2 being laminated using tool paths 4 selected in such a way that the larger a change in shape between tool paths of upper and lower layers is in the source data, the shorter an interlayer spacing in the source data is made.

DESCRIPTION OF THE PREFERRED EMBODIMENT

An embodiment of the present invention is described below. The features of the invention disclosed in the embodiment may be combined with one another. Further, each of the features may be regarded as an independent invention.

Hereinafter, an exemplary embodiment where the base structure is a gyroid structure is described.

1. OBJECT 5

The object 5 (shown in FIG. 11B), according to an embodiment of the present invention, has a pseudo-gyroid structure, which is described later, and has a higher isotropic deformability (i.e., having equal deformability against loading from different directions) than the object disclosed in Patent Literature 1. The object 5 may be used, for example, as a cushioning material (particularly those that may come into contact with human body, such as insoles, parts of prosthetic legs, etc.). The method for manufacturing the object 5 according to this embodiment is explained step by step below.

2. GYROID STRUCTURE

Figure 1:
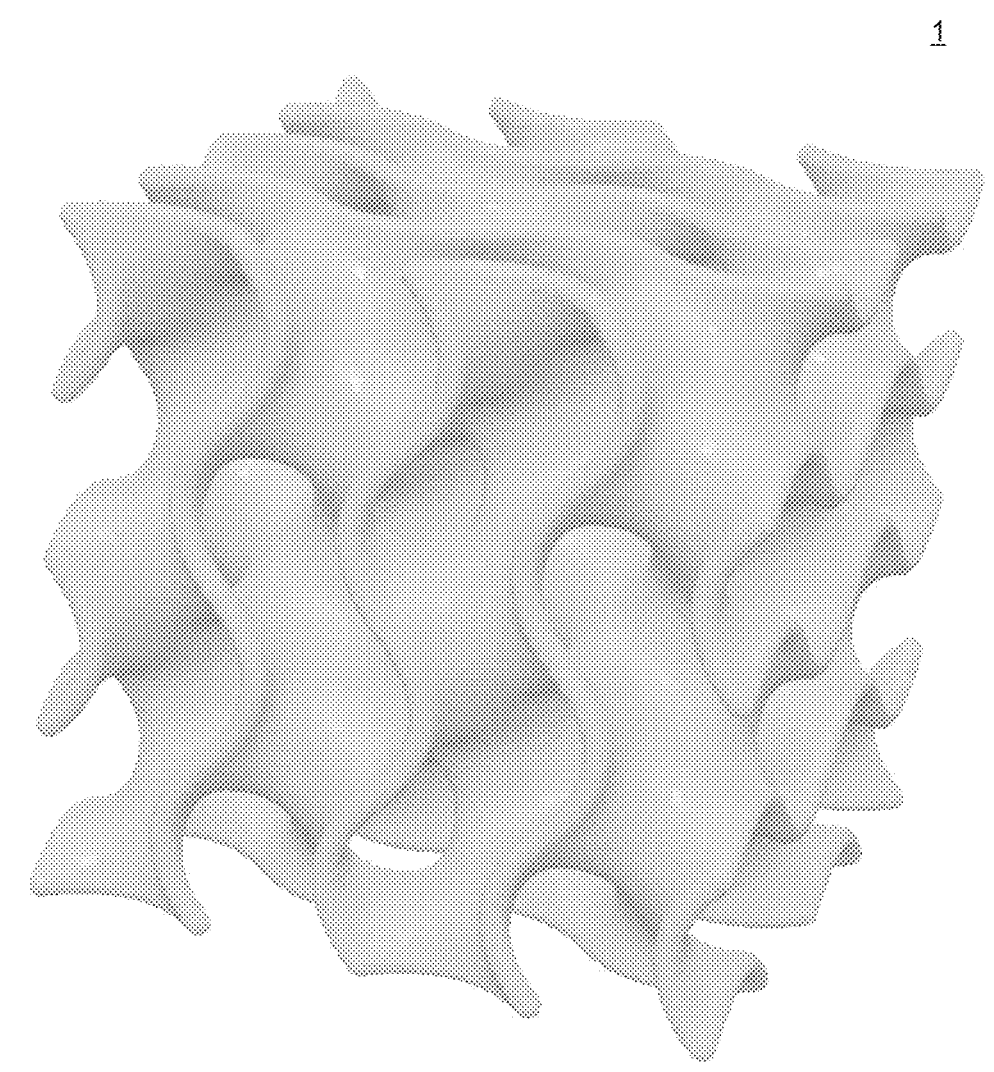
FIG. 1 is a perspective view of the gyroid structure 1.
Figure 1:
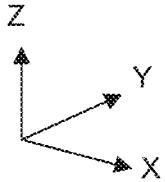

First, a gyroid structure pertaining to the present invention is explained. As shown in FIG. 1, the gyroid structure 1 is a structure having a thickness based on a gyroid, which is a three-dimensional periodic minimum surface connected infinitely in three directions. An approximate formula of a gyroid may be expressed as Equation 1 using trigonometric functions. Since a gyroid is composed of surfaces meandering in each of the X, Y, and Z directions, a gyroid structure has excellent isotropic deformability.

$$\sin x \cos y + \sin y \cos z + \sin z \cos x = 0 \tag{1}$$

3. ADDITIVE MANUFACTURING OF A GYROID STRUCTURE

Additive manufacturing of a gyroid structure starts by creating modeling data containing tool paths for forming each of a plurality of single-layer structures 2, which are obtained by slicing the gyroid structure in the Z direction at a predetermined modeling pitch. The plurality of single-layer structures 2 are laminated in the Z direction. Tool paths are two-dimensional data indicating paths for moving a nozzle in forming the single-layer structures 2, extending on the XY plane. Modeling data includes information necessary for modeling, such as tool paths and modeling pitches for each layer of an object to be manufactured. The nozzle is moved, while extruding fluidized resin, along the tool paths to form the fluidized resin, and then the fluidized resin is solidified to form the single-layer structures 2. The fluidized resin means resin that has been softened by heat in the cases where the hot melt lamination method is used for the additive manufacturing, whereas the fluidized resin means uncured resin in the cases where the UV curing method is used. In the former cases, the fluidized resin is solidified by cooling, whereas in the latter cases, the fluidized resin is solidified by UV irradiation.

Figure 2:
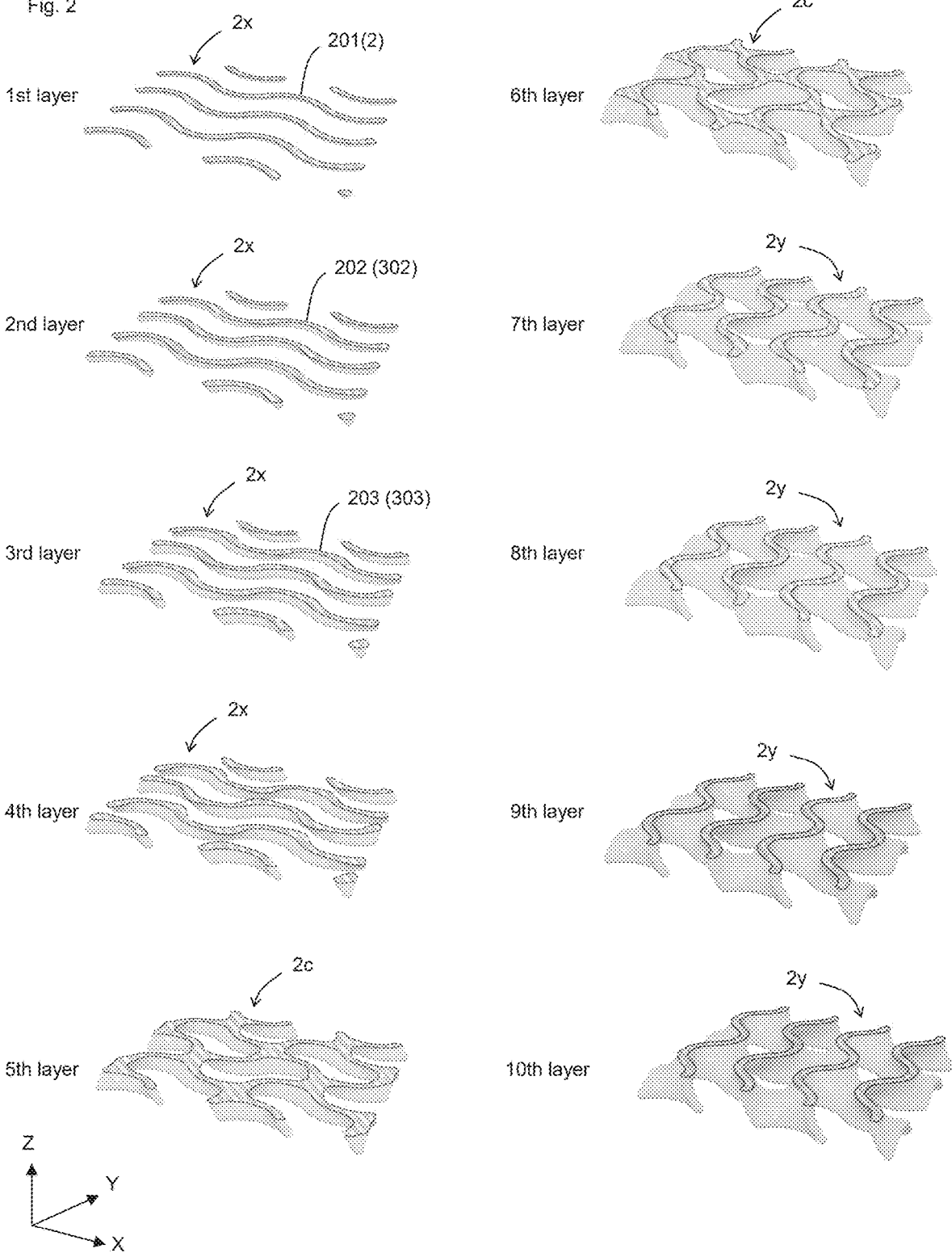
FIG. 2 is a perspective view of the process of forming the gyroid structure 1.

As shown in FIG. 2 with regard to the 1st layer, forming a layered object starts by moving a nozzle, while extruding fluidized resin, along the tool path of the 1st layer on a modeling table (not shown). As a result, the 1st layer is formed to become the single-layer structure 201.

Next, after raising the nozzle by a modeling pitch, the nozzle is moved along the tool path of the 2nd layer, while extruding fluidized resin, on the 1st layer (i.e., single-layer structure 201) to form the single-layer structure 202. The single-layer structures 201 and 202 are fused together to become the laminated structure 302. Note that the nozzle may be raised relative to the modeling table, i.e., instead of raising the nozzle, the modeling table may be lowered.

Figure 3:
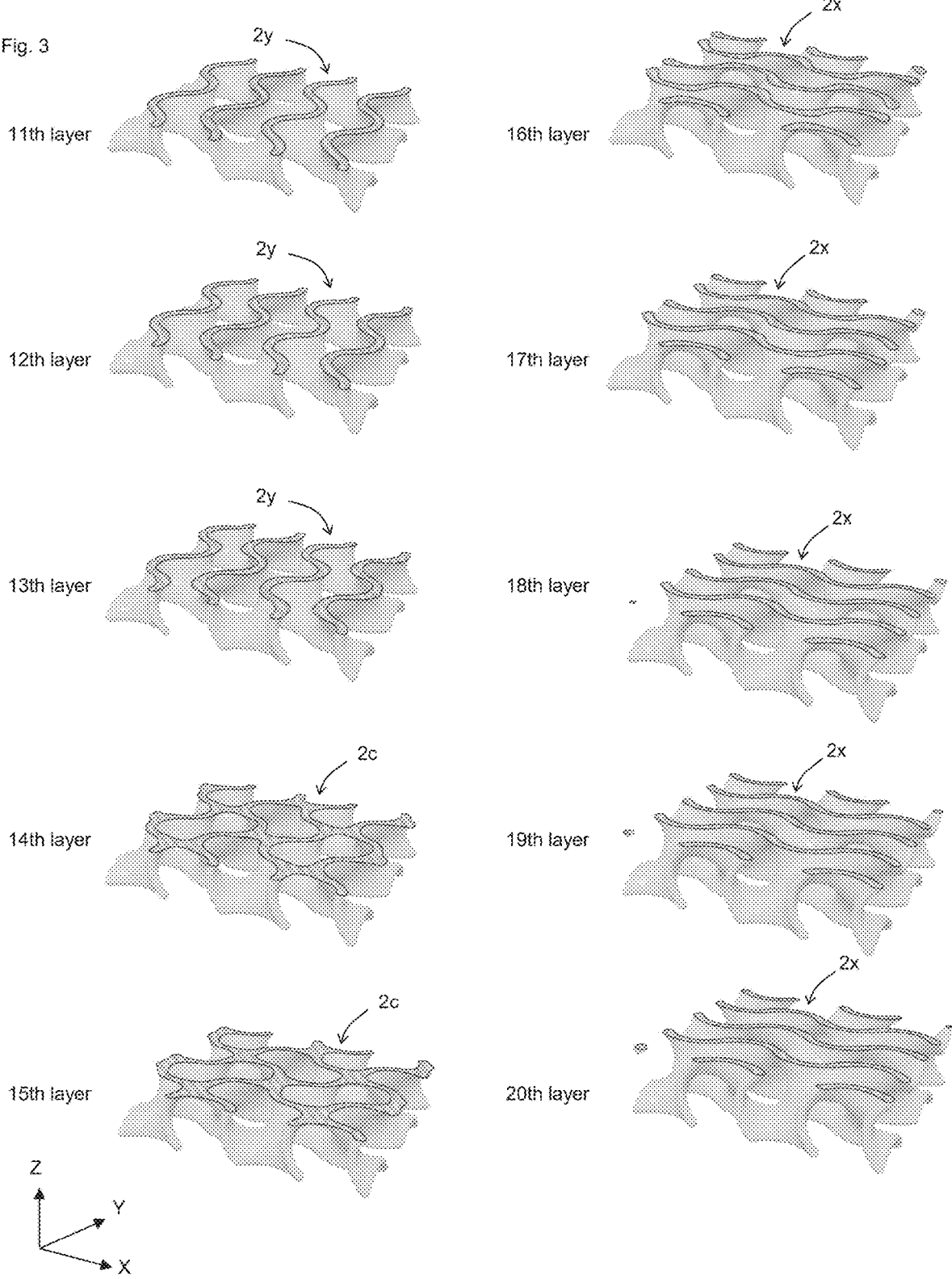
FIG. 3 is a perspective view of the process of forming the gyroid structure 1.
Figure 4:
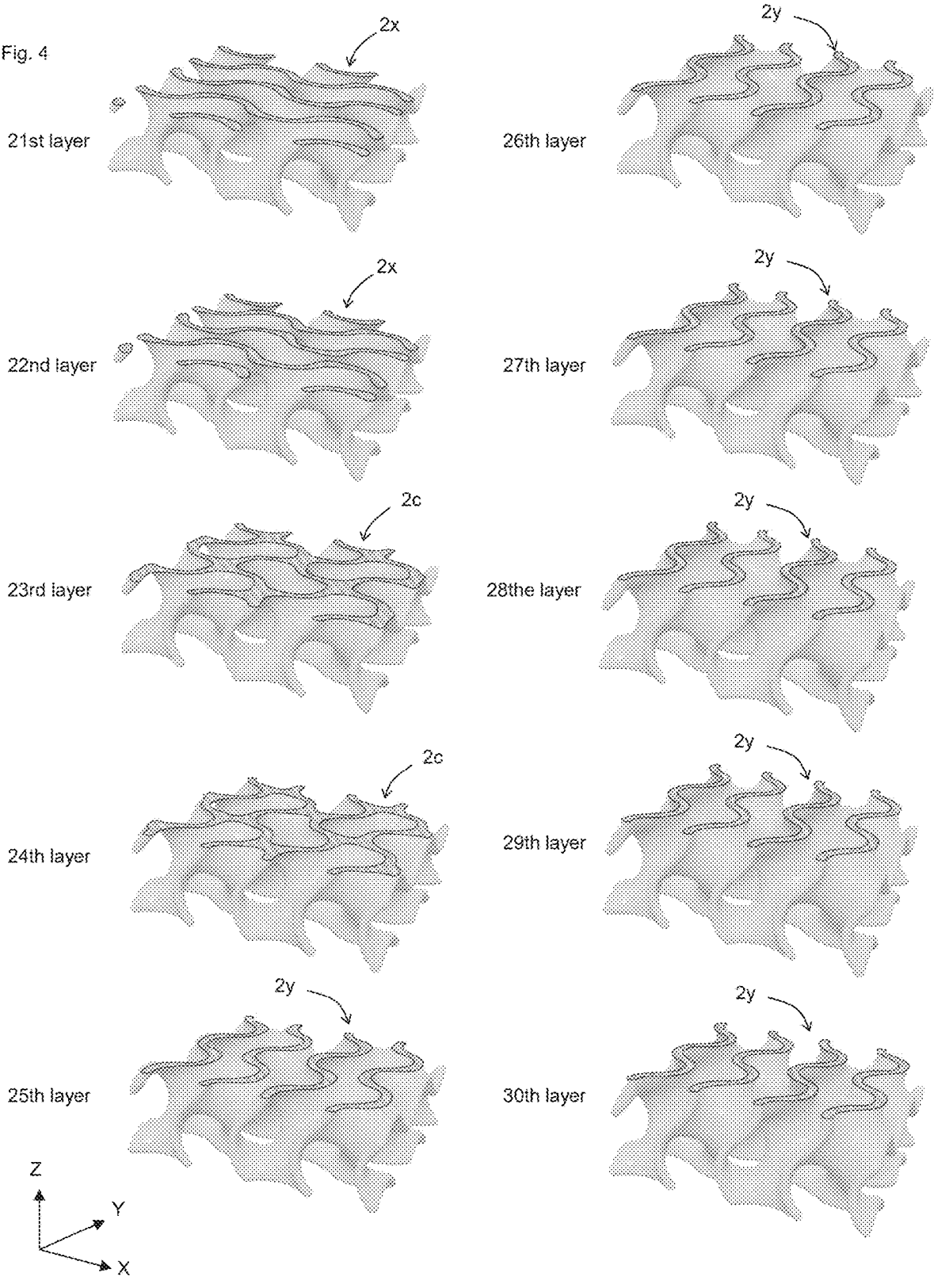
FIG. 4 is a perspective view of the process of forming the gyroid structure 1.
Figure 5:
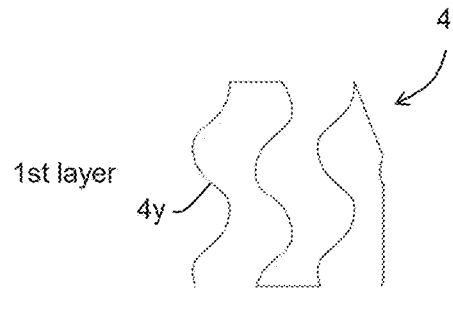
FIG. 5 shows tool paths 4 for forming each of the single-layer structures 2 constituting the gyroid structure 1.
Figure 5:
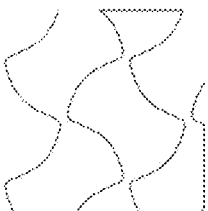
Figure 5:
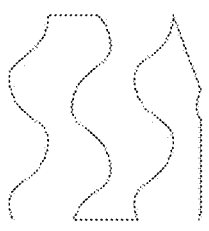
Figure 5:
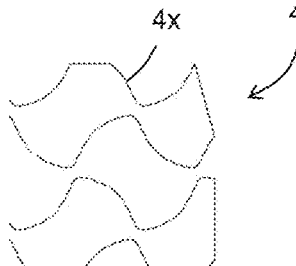
Figure 5:
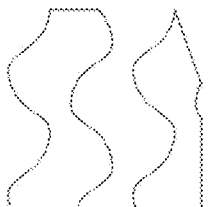
Figure 5:
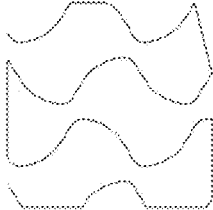
Figure 5:
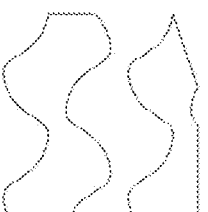
Figure 5:
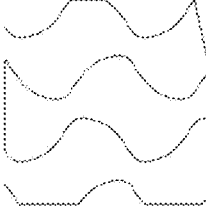
Figure 5:
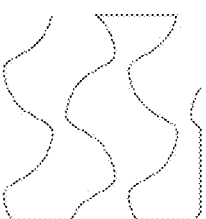
Figure 5:
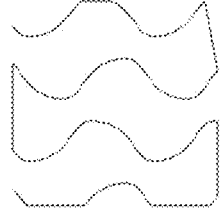
Figure 6:
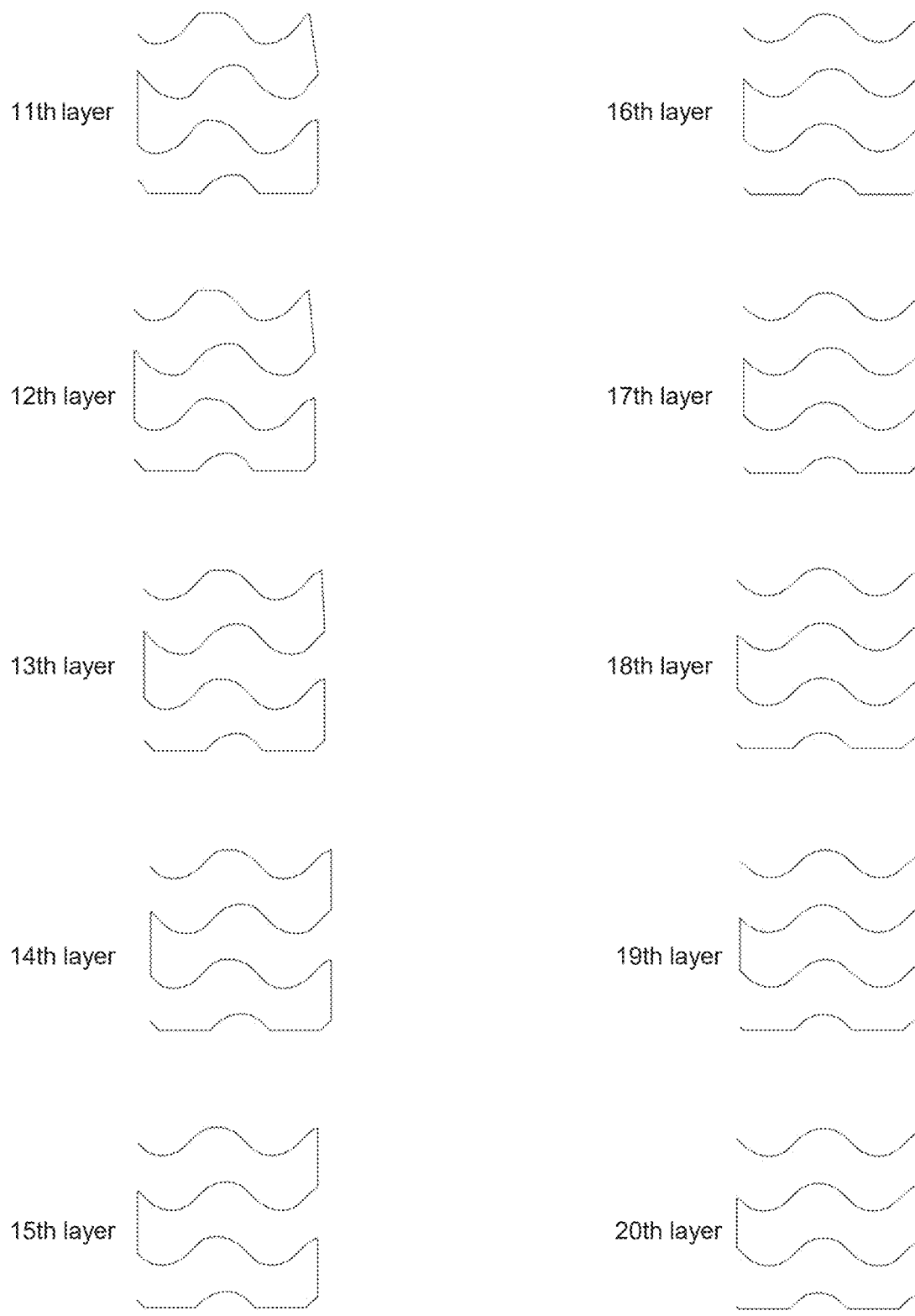
FIG. 6 shows tool paths 4 for forming each of the single-layer structures 2 constituting the gyroid structure 1.
Figure 7:
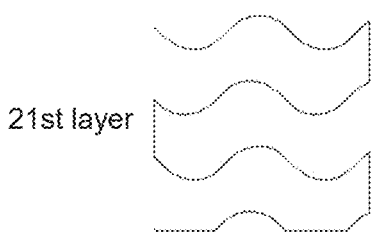
FIG. 7 shows tool paths 4 for forming each of the single-layer structures 2 constituting the gyroid structure 1.
Figure 7:
Figure 7:
Figure 7:
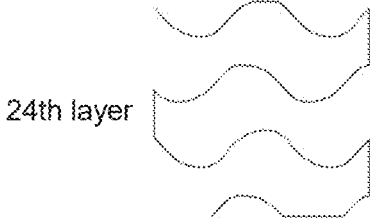
Figure 7:
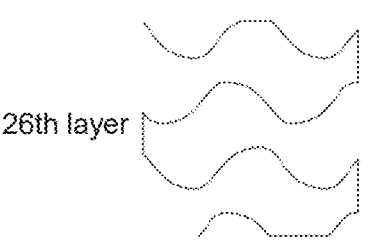
Figure 7:
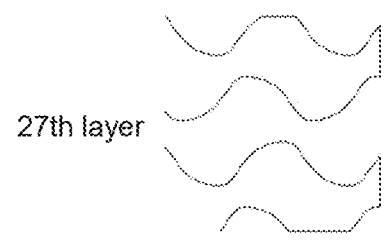
Figure 7:
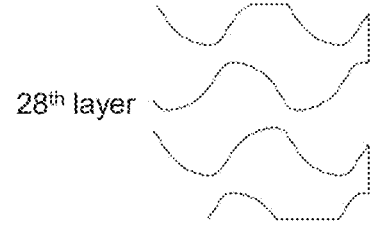
Figure 7:
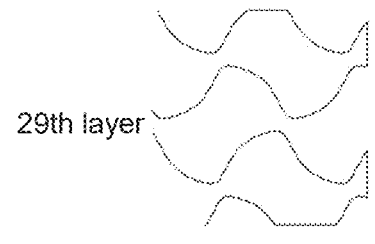
Figure 7:
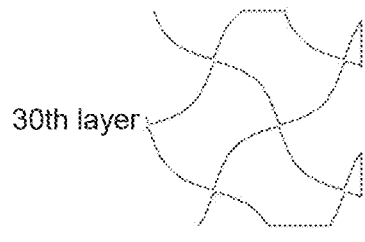
Figure 8:
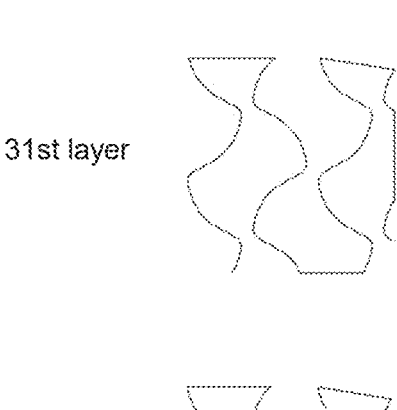
FIG. 8 shows tool paths 4 for forming each of the single-layer structures 2 constituting the gyroid structure 1.
Figure 8:
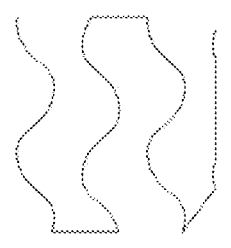
Figure 8:
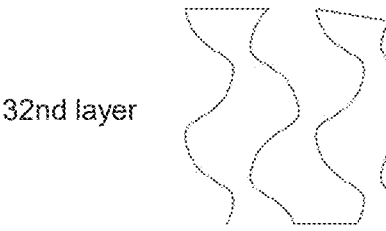
Figure 8:
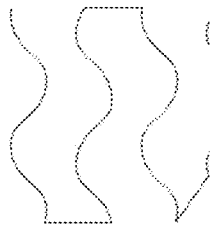
Figure 8:
Figure 8:
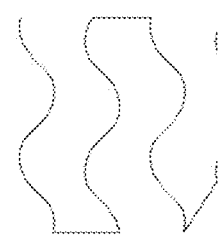
Figure 8:
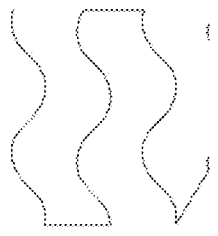
Figure 8:
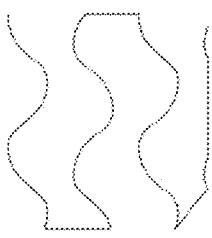
Figure 8:
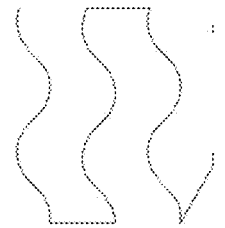
Figure 9:
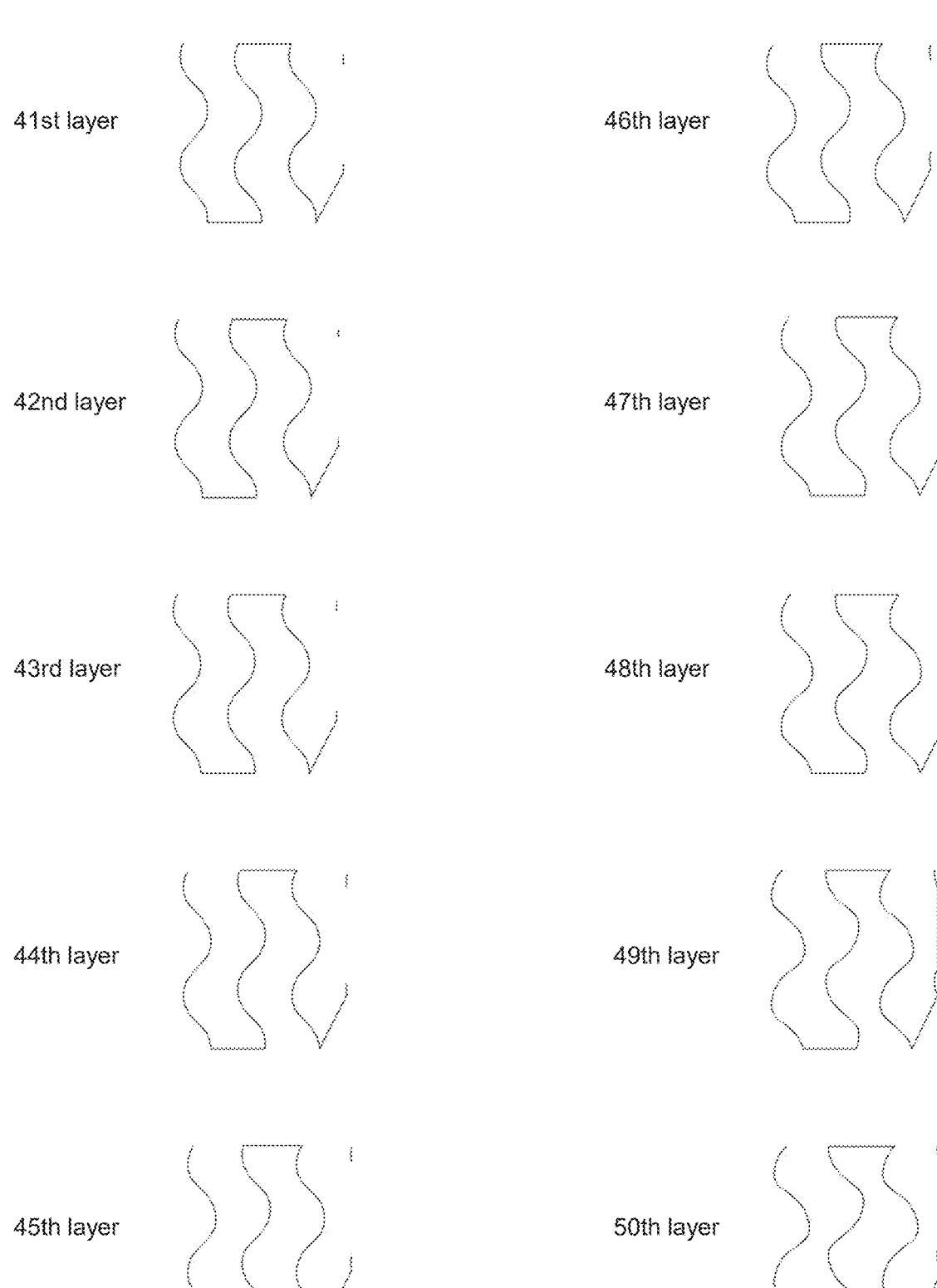
FIG. 9 shows tool paths 4 for forming each of the single-layer structures 2 constituting the gyroid structure 1.
Figure 10:
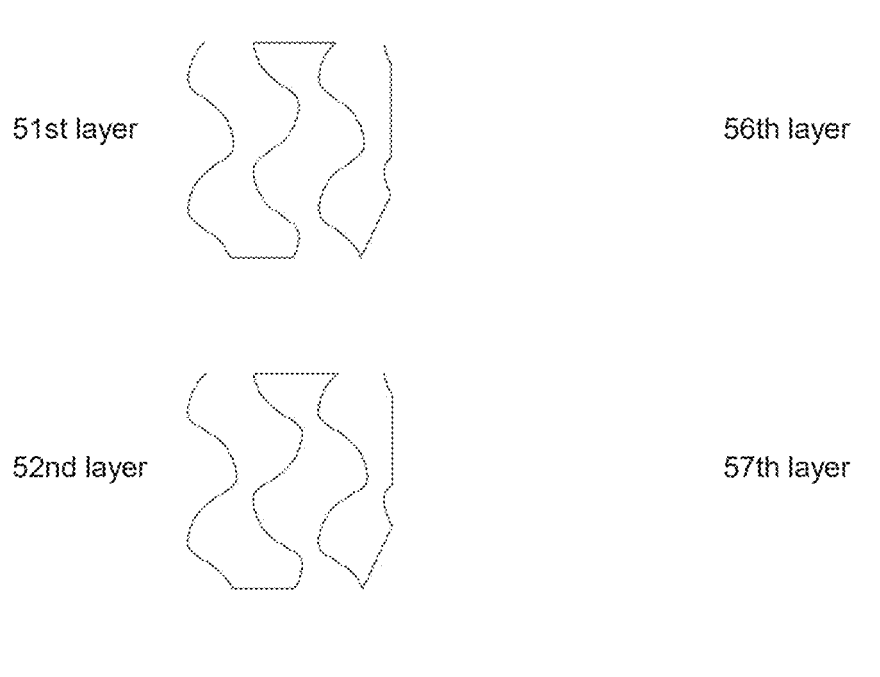
FIG. 10 shows tool paths 4 for forming each of the single-layer structures 2 constituting the gyroid structure 1.
Figure 10:
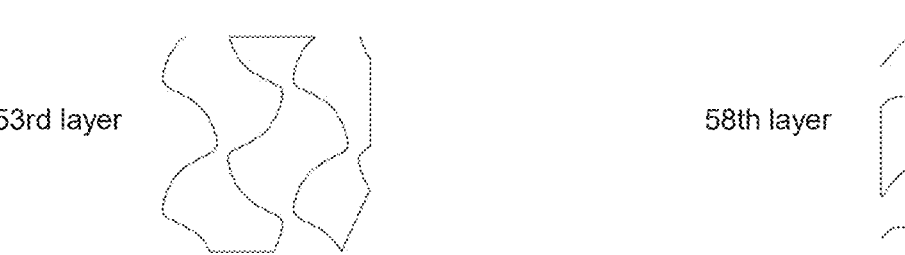
Figure 10:
Figure 10:

Next, after raising the nozzle by a modeling pitch, the nozzle is moved, while extruding fluidized resin, on the laminated structure 302 formed up to its 2nd layer along the tool path of the 3rd layer. As a result, the 3rd layer is formed to become the single-layer structure 203. The single-layer structure 203 is fused to the laminated structure 302 to obtain the laminated structure 303 formed up to its 3rd layer. Thereafter, the same process is repeated up to the 30th layer; each layer at the time of its completion is shown in FIGS. 2 to 4.

By repeating the above steps up to the top layer in the modeling data, a desired object having the gyroid structure 1 may be obtained.

4. ANALYSIS OF THE GYROID STRUCTURE

Here, the gyroid structure is analyzed in detail. Referring to FIGS. 2 to 4, the 1st to 4th layers and the 16th to 22nd layers have the portions $2x$ where the single-layer structures 2 meander in the X-direction. A layer having such a single-layer structure 2 is referred to as an X-direction meandering layer. The 7th to 13th layers and the 25th to 30th layers have the portions $2y$ where the single-layer structures 2 meander in the Y-direction. A layer having such a single-layer structure 2 is referred to as a Y-direction meandering layer. The 5th to 6th layers, the 14th to 15th layers, and the 23rd to 24th layers have the joint portions $2c$ where the X-direction meandering portions and the Y-direction meandering portions are joined together. A layer having such a single-layer structure 2 is referred to as a joint layer. In this manner, the gyroid structure is created by alternatively forming X-direction meandering layers and Y-direction meandering layers with joint layers in between.

5. DELAMINATION DUE TO CHANGE IN MODELING PITCH OF THE GYROID STRUCTURE

To mass-produce an object having a gyroid structure, the modeling speed needs to be increased. Increasing the modeling speed may be achieved by increasing the modeling pitch of the gyroid structure. FIGS. 2 to 4 shows an example of increasing the modeling pitch, where only one in every three layers are formed (e.g., 1st layer, 4th layer, 7th layer, 10th layer, 13th layer, 16th layer, etc.). In such a case, using tool paths for forming the single-layer structures of these layers, the modeling pitch is tripled while the discharge amount of the fluidized resin is also increased accordingly. This reduces the number of layers required for manufacturing the object into one third, shortening the modeling time.

In the above-mentioned method, a single-layer structure 2 is formed along the tool path of the 7th layer on the single-layer structure 2 formed along the tool path of the 4th layer. However, the single-layer structures 2 of the 4th layer and the 7th layer have a large difference in shape, and the overlap viewed along the stacking direction (i.e., Z-axis direction) is small, resulting in almost point contact between these layers. For this reason, forming a gyroid structure at such a modeling pitch results in weak bonding between the single-layer structures 2 at portions where a layer switches between X-direction and the Y-direction meandering layers (e.g., between the 4th and 7th layers). Weak bonding makes interlayer peeling likely to occur at such portions. In other words, although simply increasing the modeling pitch shortens the modeling time, delamination of the object becomes more likely to occur.

6. SOLVING THE DELAMINATION PROBLEM OF THE GYROID STRUCTURE

The inventor of the present invention found that forming only one in every three layers (e.g., skipping the 2nd and 3rd layers and forming the 4th layer on the 1st layer, or skipping the 8th and 9th layers and forming the 10th layer on the 7th layer) would not be a problem if the layers to be stacked are both X-direction meandering layers or Y-direction meandering layers (e.g., 1st and 4th layers, 7th layer and 10th layer) as such layers have similar shapes in terms of the shapes of single-layer structures 2 (i.e., such layers have similar tool path shapes) and have a large overlap viewed along the stacking direction (i.e., the Z direction).

Based on the above finding, the inventor further conceptualized selecting tool paths in such a way that the larger a change in shape between tool paths of upper and lower layers is in the source data, the shorter an interlayer spacing in the source data is made. The selecting is performed by selecting a part of the tool paths in the source data, which includes tool paths for forming each of multiple single-layer structures obtained by slicing the gyroid structure at a predetermined modeling pitch, and the modeling data is created for manufacturing the object 5 in this embodiment.

In the exemplary embodiment as shown in FIGS. 2 to 4, the overlap of single-layer structures between upper and lower layers is large (i.e., the change in shape between the tool paths of the upper and lower layers is small) at portions where the upper and lower layers are both X-direction meandering layers (e.g., 1st and 4th layer, 16th and 22nd layer) or both Y-direction meandering layers (e.g., 7th and 13th layer, 25th and 30nd layer). By contrast, the overlap of single-layer structures between upper and lower layers is small (i.e., the change in shape between the tool paths of the upper and lower layers is large) at portions where one of the upper and lower layers is an X-direction meandering layer while the other is a Y-direction meandering layer (e.g., 4th and 7th layer, 13th and 16th layer). In such a case, the tool paths corresponding to the single-layer structures of the 1st layer, 4th layer to 7th layer, 10th layer, 13th layer to 16th layer, 19th layer, 22nd to 25th layer, and 28th layer are selected, for example, in creating modeling data for manufacturing the object 5. In this selection method, the middle two layers are included at portions where the upper and lower layers switch between X-direction and Y-direction meandering layers (thereafter referred to as switching portions), whereas the middle two layers are skipped at portions where the upper and lower layers are both X-direction or Y-direction meandering layers (thereafter referred to as continuous portions).

According to this selection method, delamination of the object 5 is prevented at the switching portions since the shape of the single-layer structures changes gradually (e.g., 4th layer, 5th layer, 6th layer, 7th layer) and the overlap between upper and lower layers increases. At the continuous portions, on the other hand, the modeling speed is increased since the middle two layers are skipped.

The object 5 created from the modeling data prepared with the above selection method has a pseudo-gyroid structure (i.e., a structure in which the continuous portions are shortened in height relative to the switching portions). The pseudo-gyroid structure maintains to some extent the characteristics of a gyroid structure since the pseudo-gyroid structure is obtained from a gyroid structure by compressing the continuous portions in the Z direction. As a result, the present invention offers the object 5, which has better isotropic deformability than the object disclosed in Patent Literature 1.

Note that the selection method only requires that the number of layers to be skipped (i.e., the interlayer spacing in the source data) be greater in the continuous portions than in the switching portions. This means, for example, in the switching portions one in every two layers are skipped, whereas in the continuous portions two in every three layers are skipped.

In summary, the object 5 having a pseudo-gyroid structure, which facilitates preventing delamination and increasing the modeling speed, is obtained by manufacturing the object 5 using modeling data prepared by selecting tool paths in such a way that the larger a change in shape between tool paths of upper and lower layers is in the source data, the shorter an interlayer spacing in the source data is made.

7. METHOD FOR MANUFACTURING THE OBJECT IN THIS EMBODIMENT

The object 5 according to this embodiment may be obtained by additive manufacturing using the modeling data prepared with the above method. As explained in "3. Additive manufacturing of a gyroid structure", additive manufacturing may be performed by stacking the single-layer structures 2 formed along the tool path of each layer. Additive manufacturing may be performed using any method (e.g., the UV curing method, the hot melt lamination method, etc.), but the hot melt lamination method, in which molten resin are laminated, is preferable.

The diameter of the thread-shaped resin constituting the single-layer structures 2 and the modeling pitch are both set to a value between, for example, 0.3 and 6.0 mm; a value between 1.0 and 4.0 mm is preferable. The diameter is, for example, 0.3, 0.5, 1.0, 1.5, 2.0, 2.5, 3.0, 3.5, 4.0, 4.5, 5.0, 5.5, or 6.0 mm; the diameter may also be set to an arbitrary value between any two of these exemplary values. The diameter of the thread-shaped resin is preferably greater than the modeling pitch. Hence, the ratio of the diameter of the thread-shaped resin to the modeling pitch (i.e., the diameter of the thread-shaped resin divided by the modeling pitch) is set to a value between, for example, 1.1 and 6. The ratio is, for example, 1.1, 1.2, 1.3, 1.4, 1.5, 2.0, 2.5, 3.0, 3.5, 4.0, 4.5, 5.0, 5.5, 6.0; the ratio may also be set to an arbitrary value between any two of these exemplary values.

The resin that constitutes the object 5 is not limited to a particular resin; the resin may be acrylonitrile-butadiene-styrene (ABS), polyolefin (e.g. polypropylene), polyester, thermoplastic elastomer, etc. The resin is preferably a thermoplastic elastomer if the object 5 needs high flexibility (e.g., the high flexibility of cushioning materials).

The thermoplastic elastomer may be a styrenic elastomer, an olefin elastomer, an acrylic elastomer, etc. The thermoplastic elastomer preferably comprises a styrenic elastomer. The thermoplastic elastomer comprising a styrenic elastomer has high flexibility due to the high flexibility of styrenic elastomers. The proportion of styrenic elastomers in the thermoplastic elastomer is preferably 50 to 100% by mass, and more preferably 80 to 100% by mass. The proportion is, for example, 50, 60, 70, 80, 90, 100% by mass; the proportion may also be set to an arbitrary value between any two of these exemplary values.

A styrenic elastomer is a thermoplastic elastomer with styrene units and is formed by blending at least one of the followings: styrenic copolymers (e.g., styrene-ethylene-styrene block copolymer (SES), styrene-butadiene-styrene block copolymer (SBS), styrene-isoprene-styrene block copolymer (SIS), styrene-butadiene rubber (SBR), etc.), hydrogenated styrenic copolymers (e.g., styrene-ethylene/propylene-styrene block copolymer (SEPS), styrene-ethylene/butylene-styrene block copolymer (SEBS), styrene-butylene/butadiene-styrene block copolymer (SBBS), hydrogenated styrene-butadiene Rubber (HSBR), etc.), etc.

The thermoplastic elastomer preferably has a Shore A hardness of between 0 and 10. The Shore A hardness is, for example, 0, 1, 2, 3, 4, 5, 6, 7, 8, 9, 10; the Shore A hardness may also be an arbitrary value between any two of these exemplary values. The object 5 has excellent flexibility if the Shore A hardness is in this range. The Shore A hardness is measured in accordance with the JIS K6253 standard.

8. THE STRUCTURE OF THE OBJECT 5

The object 5 comprises a three-dimensional sieve-like structure composed of a pseudo-gyroid structure. Changing the size of the pseudo-gyroid structure and/or the thickness of the thread-shaped resin comprising the single-layer structures results in different stiffnesses of the object 5. The stiffness of the object 5 needs to be controlled according to users' needs in the cases of the object 5 being used as a cushioning material, and such needs are easily accommodated by the object 5 comprising a three-dimensional sieve-like structure.

9. SPECIFIC EXAMPLES OF SELECTING TOOL PATHS AND MANUFACTURING AN OBJECT USING THE SELECTED TOOL PATHS

Here, examples of tool path selection are provided using more specific data. FIGS. 5 to 10 show tool paths 4 of the 60 layers for forming each of a plurality of single-layer structures obtained by slicing the gyroid structure 1 at a modeling pitch of 0.1 mm. The horizontal direction of FIGS. 5 to 10 is defined as the X direction, whereas the vertical direction is defined as the Y direction. In the explanation below, X-direction meandering portions 4x and Y-direction meandering portions 4y of the tool paths 4 correspond to X-direction meandering portions 2x and Y-direction meandering portions 2y of the single-layer structures 2, respectively. In addition, since the thread-shaped resin 2b formed along the tool paths 4 has a certain thickness, forming a single-layer structure along a tool path comprising portions where the distance between adjacent X-direction meandering portions 4x or adjacent Y-direction meandering portions 4y is small (e.g., 6th to 7th layer) results in connecting the adjacent X-direction meandering portions 2x or the adjacent Y-direction meandering portions 2y to form joint portions 2c.

The tool paths 4 of the 1st to 6th layers has a plurality of Y-direction meandering portions 4y, which meander in the Y-direction. In the 1st to 3rd layers, the plurality of Y-direction meandering portions 4y extend in substantially parallel, and the change in shape between the tool paths of upper and lower layers is small. From the 4th to 6th layers, the shape of the tool paths 4 changes in such a way that the adjacent Y-direction meandering portions 4y progressively approach each other, and at the 6th layer, the distance between the adjacent Y-direction meandering portions 4y is minimized.

The tool paths 4 of the 7th to 30th layers have a plurality of X-direction meandering portions 4x, which meander in the X-direction. The extending direction of the meandering portions changes from the Y direction to the X direction between the 6th and 7th layers. From the 7th to 9th layers, the shape of the tool paths 4 changes in such a way that the adjacent X-direction meandering portions 4x are progressively separated from each other, whereas from the 10th to 27th layers, the plurality of X-direction meandering portions 4x extend in substantially parallel, and the shape of the tool paths does not change significantly between upper and lower layers. From the 28th to 30th layers, the shape of the tool paths 4 changes in such a way that the adjacent X-direction meandering portions 4x progressively approach each other, and at the 30th layer, the distance between the adjacent X-direction meandering portions 4x is minimized.

The tool paths 4 of the 31st to 53rd layers have a plurality of Y-direction meandering portions 4y, which meander in the Y-direction. The extending direction of the meandering portions changes from the X direction to the Y direction between the 30th and 31st layers. From the 31st to 33rd layers, the shape of the tool paths 4 changes in such a way that the adjacent Y-direction meandering portions 4y are progressively separated from each other, whereas from the 34th to 50th layers, the plurality of Y-direction meandering portions 4y extend in substantially parallel, and the shape of the tool paths does not change significantly between upper and lower layers. From the 51st to 53rd layers, the shape of the tool paths 4 changes in such a way that the adjacent Y-direction meandering portions 4y progressively approach each other, and at the 53rd layer, the distance between the adjacent Y-direction meandering portions 4y is minimized.

The tool paths 4 of the 54th to 60th layers have a plurality of X-direction meandering portions 4x, which meander in the X-direction. The extending direction of the meandering portions changes from the Y direction to the X direction between the 53rd and 54th layers. From the 54th to 56th layers, the shape of the tool paths 4 changes in such a way that the adjacent X-direction meandering portions 4x are progressively separated from each other, whereas from the 57th to 60th layers, the plurality of X-direction meandering portions 4x extend in substantially parallel, and the shape of the tool paths does not change significantly between upper and lower layers.

As shown above, the shape of the tool paths 4 between upper and lower layers changes significantly at the particular layers where the extending direction of the meandering portions switches between the X direction and the Y direction as well as at the layers adjacent to these particular layers (e.g., 4th to 9th layers, 28th to 33rd layers, 51st to 56th layers). A collection of these particular and adjacent layers is herein referred to as a "layer group of large change." By contrast, in the layers between layer groups of large change (e.g., 1st to 3rd layer, 10th to 27th layer, 34th to 50th layer, 57th to 60th layer), the shape of the tool paths 4 between upper and lower layers does not change significantly. A collection of these layers is herein referred to as a "layer group of small change."

By taking advantage of such characteristics of the change in shape of tool paths, tool paths 4 may be selected in such a way that the larger a change in shape between tool paths 4 of upper and lower layers is in the source data (i.e., the data based on which the object 5 is manufactured), the shorter an interlayer spacing in the source data is made.

For example, in a layer group of large change, the layers where the extending direction of the meandering portions changes from the Y direction to the X direction (e.g., 6th to 7th layers, 30th to 31st layers, 53rd to 54th layers) are selected, and the additional layers that are separated from the selected layers by one layer (i.e., an interlayer spacing of one) are also selected. In a layer group of small change, on the other hand, three layers that are separated from one another by a substantially equal spacing are selected. Using such a selection method, among the 7th to 30th layers, for example, the 7th, 9th, 28th, and 30th layers are selected from the layer group of large change, while the 14th, 19th and 24th layers are selected from the layer group of small change. The interlayer spacing of 3 or 4 is applied in the layer group of small change. The above selection example has decreased the total number of layers to be modeled from 24 to 7, drastically shortening the modeling time.

FIG. 11A shows the object obtained by laminating the single-layer structure 2 of each layer using the tool paths 4 of the 7th to 30th layers at a modeling pitch of 0.1 mm. FIGS. 11A and 11B show cross sections of the thread-shaped resin 2a included in the single-layer structures 2 at one location. The layers indicated by bold circles in FIG. 11A are the selected layers. Based on the tool paths 4 of these layers, the modeling pitch and nozzle diameter are adjusted in such a way that the height of the manufactured object becomes equal to the height of the object in the source data, in creating the modeling data for obtaining the object 5 in this embodiment. Using this modeling data, the object 5 shown in FIG. 11B was obtained through additive manufacturing. The 1st to 7th layers of the single-layer structures 2 of the object 5 are the seven layers selected from the source data (i.e., 7th, 9th, 14th, 19th, 24th, 28th, 28th, and 30th layer). The position and shape of the 1st to 7th layers of the object 5 on the XY plane match those of the selected seven layers in the source data since the 1st to 7th layers are formed using the tool paths 4 of the selected seven layers in the source data. By contrast, the positions of the 1st to 7th layers in the Z direction in FIG. 11B (i.e., the vertical direction in FIG. 11) are different from those of the selected seven layers in the source data, i.e. the 1st to 7th layers are placed at an approximately equal interval in the Z direction, since the diameters of the thread-shaped resin constituting the single-layer structures 2 have been changed. In other words, the interlayer spacing is not constant among the selected seven layers in the source data, whereas an equal modeling pitch is used to form the 1st to 7th layers of the object 5 in FIG. 11B.

The object 5 shown in FIG. 11B has a shape similar to that of the object 5 created using the source data despite the fact that the modeling data with significantly fewer layers than the source data is used in the additive manufacturing. Also, the object 5 has a structure in which delamination is unlikely to occur because of the large overlap of the single-layer structures 2 between upper and lower layers. Thus, according to the present invention, it is possible to manufacture an object with high precision in a relatively short amount of time.

Note that the interlayer spacings and the number of layers to be selected in the layer groups of large and small change may be set different from those provided in the above embodiment.

10. MODIFYING TOOL PATHS

Figure 12A:
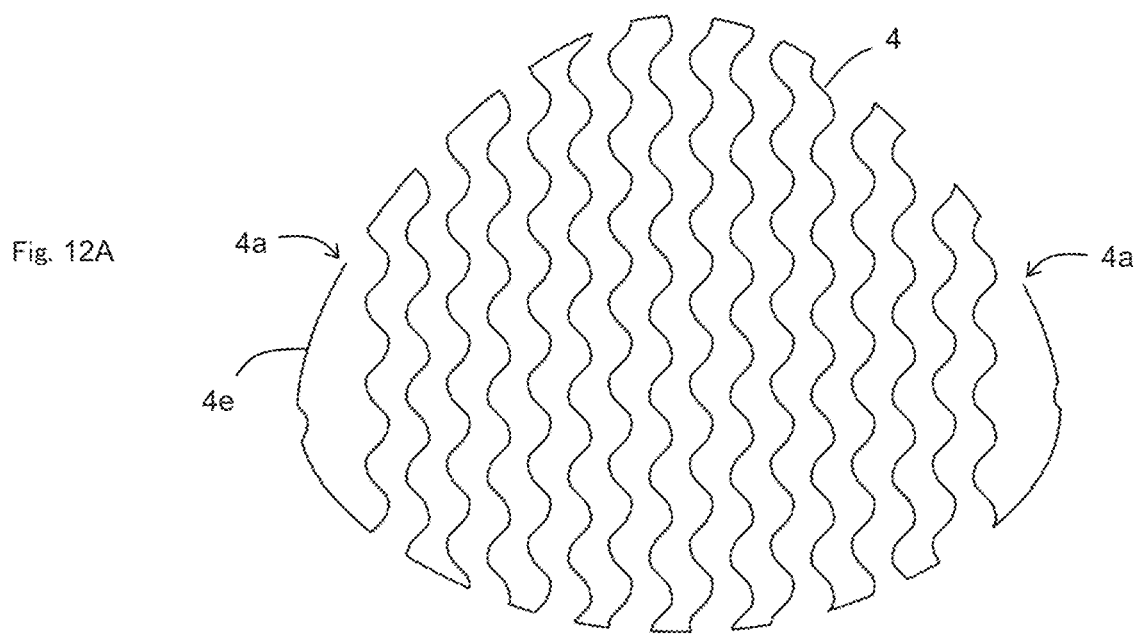
FIG. 12A shows a tool path 4 that includes an end 4a provided on an outer peripheral portion 4e.

FIG. 12A shows an example of a tool path 4 for manufacturing the object 5. This tool path 4 has a pair of ends 4a.

Figure 12B:
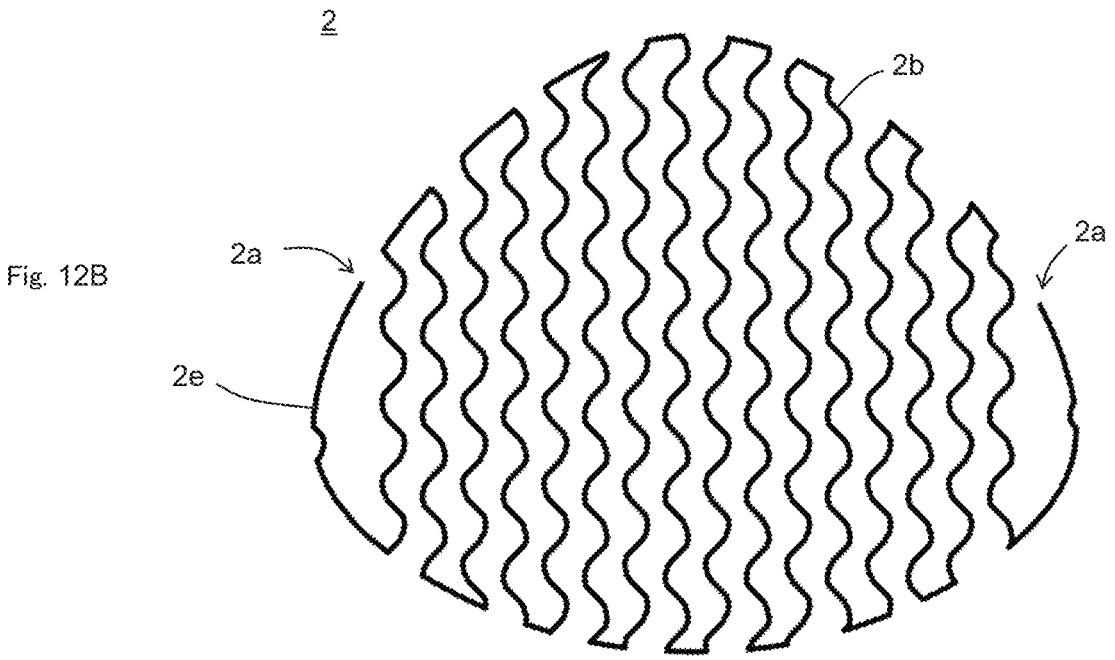
FIG. 12B shows a single-layer structure 2 that includes an end 2a provided on an outer peripheral portion 2e.

As shown in FIG. 12B, the single-layer structure 2 may be composed of thread-shaped resin 2b; the thread-shaped resin 2b is formed by moving a nozzle extruding fluidized resin along the tool path 4 between the pair of ends 4a.

Using a tool path such as the tool path 4 in forming the single-layer structure 2 results in placing an end 2a of the thread-shaped resin 2b on an outer peripheral portion 2e of the single-layer structure 2 since the end 4a is provided on the outer peripheral portion 4e of the tool path 4. If the end 2a is provided on the outer peripheral portion 2e of the single-layer structure 2, delamination of the object 5, which is formed by laminating a plurality of single-layer structures 2, is likely to initiate at the end 2a. Note that the end 2a need not be connected to an end of the upper or lower layer. If the end 2a is not connected to an end of either the upper or lower layer, the strength of the end 2a becomes particularly weak; hence, an object with such an unconnected end significantly benefits from the application of the present invention.

Figure 13A:
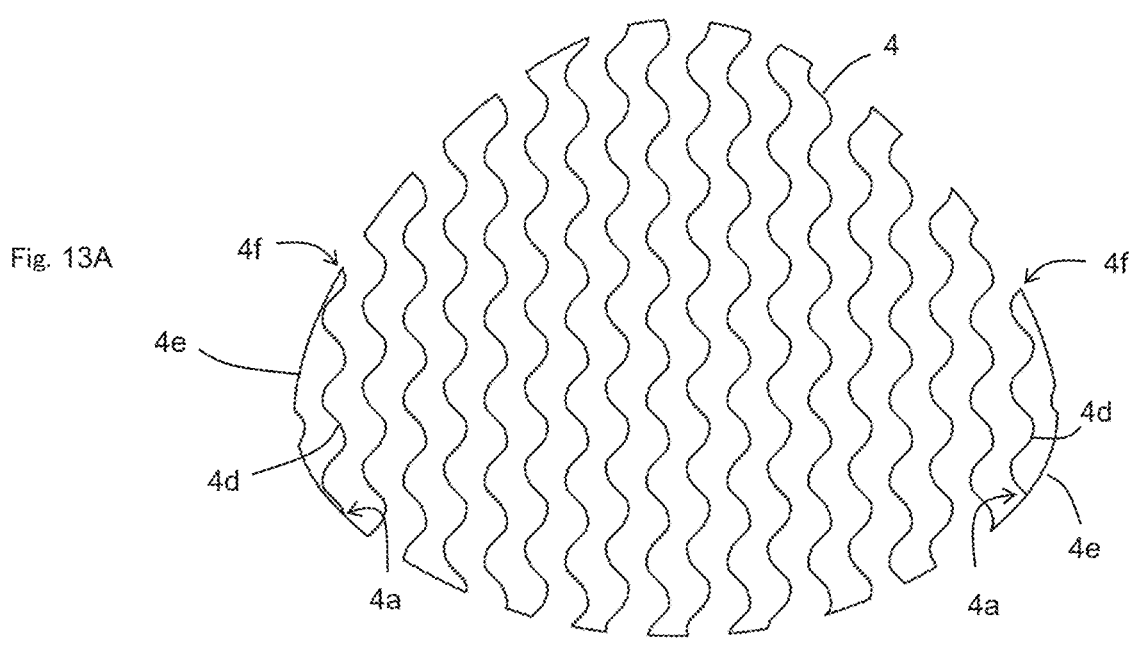
FIG. 13A shows a tool path 4 that includes a folded portion 4d.

FIG. 13A shows a modified tool path 4 for solving such a problem. The tool path 4 in FIG. 13A includes a folded portion 4d, which is folded back at a folding point 4f provided on an outer peripheral portion 4e of the tool path 4 and is located inner to the outer peripheral portion 4e. The folded portion 4d is located between an end 4a of the tool path 4 and the folding point 4f. The end 4a is preferably placed on the outer peripheral portions 4e.

Figure 13B:
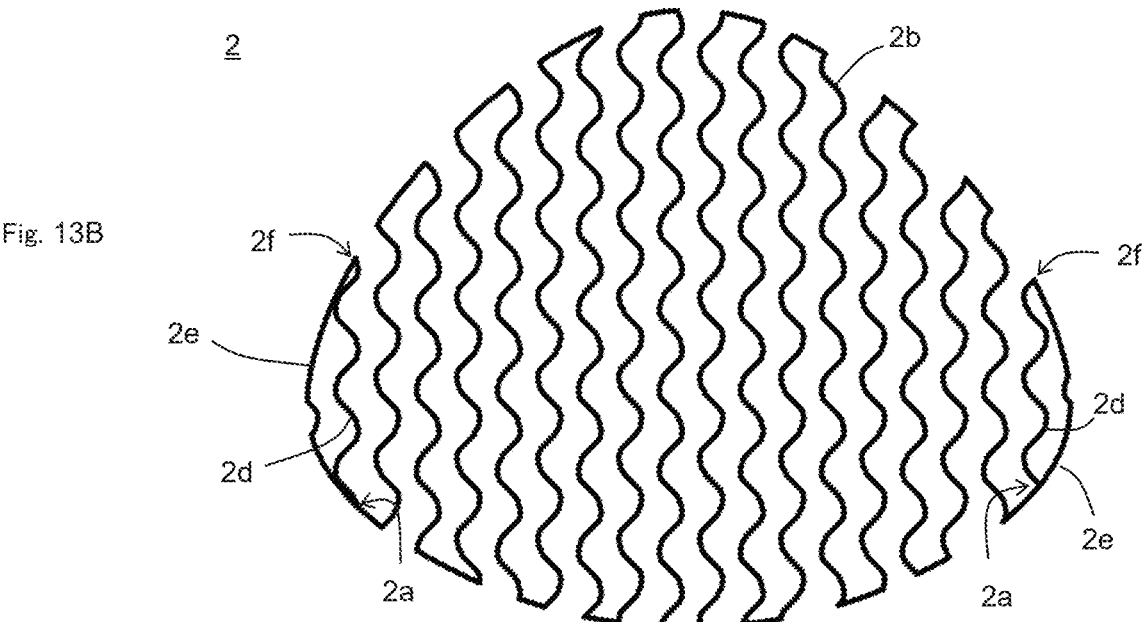
FIG. 13B shows a single-layer structure 2 that includes a folded portion 2d.

FIG. 13B shows the single-layer structure 2 that is composed of thread-shaped resin 2b; the thread-shaped resin 2b is formed by moving a nozzle extruding fluidized resin along the tool path 4 shown in FIG. 13A. The thread-shaped resin 2b constituting the single-layer structure 2 comprises a folded portion 2d, which is folded back at a folding point 2f provided on an outer peripheral portion 2e of the single-layer structure 2 and is located inner to the outer peripheral portions 2e. The folded portion 2d is located between an end 2a of the thread-shaped resin 2b and the folding points 2f.

Such features as mentioned above renders the single-layer structure 2 unsusceptible to delamination initiating at an end 2a of the single-layer structure 2 since an end 2a of the single-layer structure 2 is not exposed to the outer surfaces of the object 5. The end 2a is preferably welded to the outer peripheral portion 2e. In this case, the strength of the end 2a is further increased, and the object 5 is more unsusceptible to delamination.

Note that although a folded portion 2d, 4d need be provided in at least one of the plurality of the single-layer structures 2 constituting the object 5, a folded portion 2d, 4d is preferably provided in all of the layers having an end 2a, 4a on an outer peripheral portion 2e, 4e.

11. OTHER EMBODIMENTS

In the above embodiment, explanations are provided assuming that the base structure is a gyroid structure. However, the scope of application of the present invention is not limited to gyroid structures since the present invention facilitates modeling an object having a complex-shaped base structure other than a gyroid structure with high precision in a relatively short amount of time. The base structure may be a three-dimensional periodic minimal curved surface with thickness (e.g., gyroid structure, Schwartz-P structure, Schwartz-D structure, double gyroid structure, Fddd structure, etc.), a cubic structure, an octet structure, a cubic-octet structure, etc. In the cases where the base structure is a three-dimensional periodic minimal curved surface with thickness, the application of the present invention provides a significant technical impact since such a structure has portions where the shape of the tool paths changes significantly between upper and lower layers.

Note that the content described in "10. Modifying tool paths" may also be applied to tool paths 4 contained in modeling data for forming an object with an arbitrary structure. Thus, the content described in "10. Modifying tool paths" is not limited to a specific structure of an object.

1: gyroid structure, 2: single-layer structure, 2a: end, 2b: thread-shaped resin, 2c: joint portion, 2d: folded portion, 2e: outer peripheral portion, 2f: folding point, 2x: X-direction meandering portion, 2y: Y-direction meandering portion, 4: tool path, 4a: end, 4d: folded portion, 4e: outer peripheral portion, 4f: folding point, 4x: X-direction meandering portion, 4y: Y-direction meandering portion, 5: object, 201: single-layer structure, 202: single-layer structure, 203: single-layer structure, 302: laminated structure, 303: laminated structure

What is claimed is:

1. A method for manufacturing a modeled object, comprising:
creating the object via additive manufacturing using modeling data prepared by selecting part of tool paths, from source data, for forming respective single-layer structures obtained by slicing a base structure at predetermined modeling pitches,
wherein the selecting is performed in such a way that the larger a change in shape between tool paths of upper and lower layers is in the source data, the shorter an interlayer spacing in the source data is made.

2. A method for preparing modeling data, comprising:
selecting part of tool paths, from source data, for forming respective single-layer structures obtained by slicing a base structure at predetermined modeling pitches,
wherein the selecting is performed in such a way that the larger a change in shape between tool paths of upper and lower layers is in the source data, the shorter an interlayer spacing in the source data is made.

3. The method of claim 1, wherein the base structure is a three-dimensional periodic minimal curved surface with thickness.

4. A method for manufacturing a modeled object comprising a step of laminating a plurality of single-layer structures,
wherein the plurality of single-layer structures are each composed of thread-shaped resin formed by moving a nozzle extruding fluidized resin along tool paths,
the tool path of at least one of the plurality of single-layer structures includes a folded portion folded back at a folding point provided on an outer peripheral portion of the tool path,
the folded portion is located inner to the outer peripheral portion and is a portion between an end of the tool path and the folding point.

5. The method of claim 4, wherein the end is placed on the outer peripheral portion.

6. The method of claim 2, wherein the base structure is a three-dimensional periodic minimal curved surface with thickness.

7. The method of claim 4, wherein the tool path includes the folded portion at both ends of the tool path of each of plurality of single-layer structures.

* * * * *